March 27, 1962 R. W. VEHLING 3,027,139
FLUID DRIVE MOTOR
Filed April 14, 1960 4 Sheets-Sheet 1

INVENTOR
ROBERT W. VEHLING
BY Herbert A. Weinturn
ATTORNEY

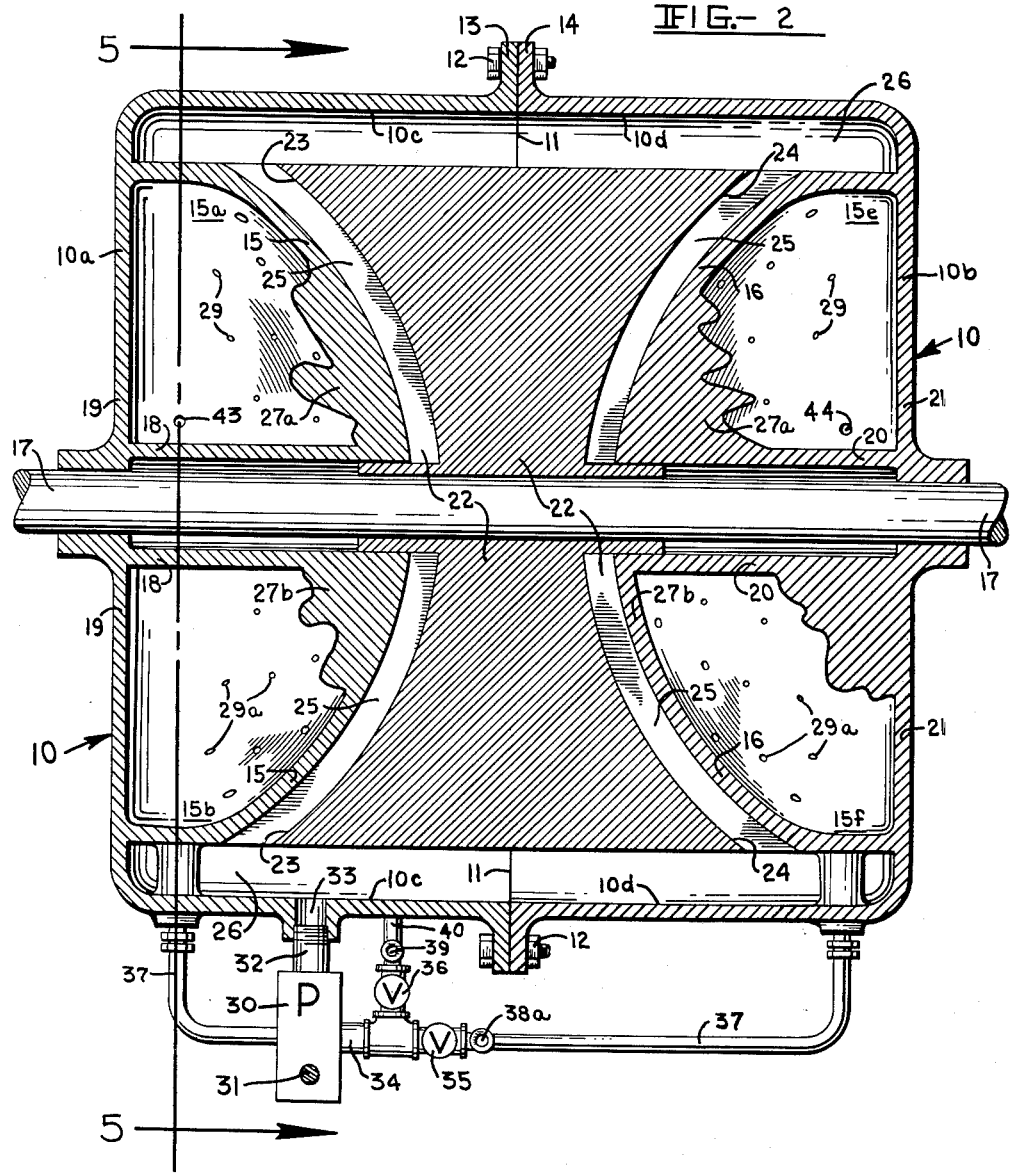

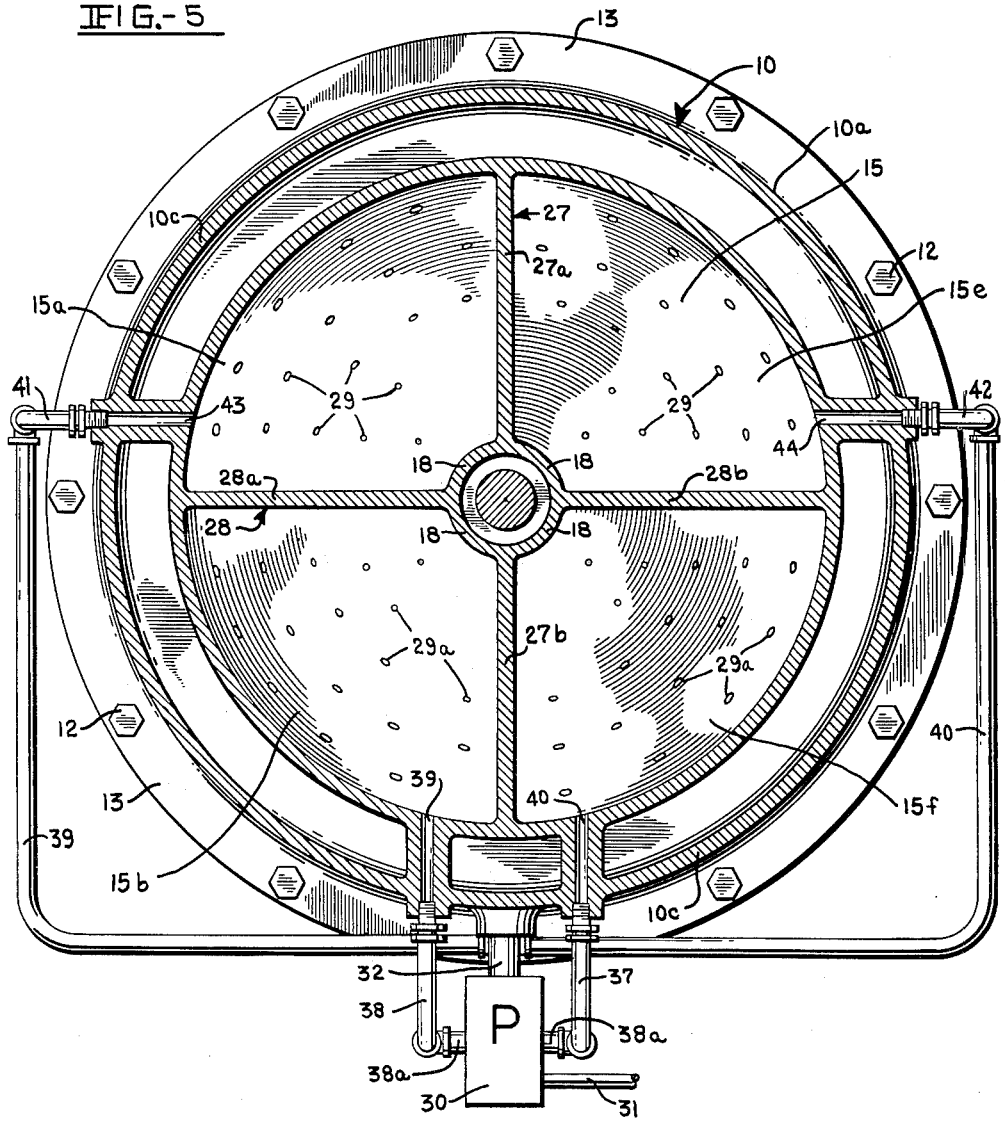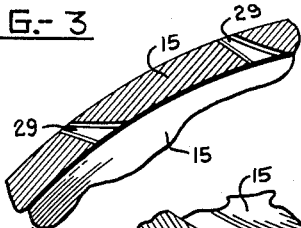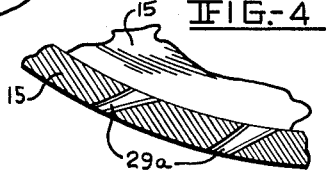

March 27, 1962 R. W. VEHLING 3,027,139
FLUID DRIVE MOTOR

Filed April 14, 1960 4 Sheets—Sheet 4

INVENTOR
ROBERT W. VEHLING
BY Herbert A. Minturn
ATTORNEY.

United States Patent Office 3,027,139
Patented Mar. 27, 1962

3,027,139
FLUID DRIVE MOTOR
Robert W. Vehling, 1202 Schleicher Road, Indianapolis, Ind., assignor of fifty percent to John F. Gleichman, Indianapolis, Ind.
Filed Apr. 14, 1960, Ser. No. 22,288
3 Claims. (Cl. 253—105)

This invention relates to a motor to which liquid is supplied by an external source to a rotary, vaned member in such manner that by changing the liquid flow to the motor, the motor may be not only changed in speed but also driven selectively in opposite directions.

The primary object of the invention is to provide a structure wherein there will be a high efficiency as between the input energy and the output energy. A further primary object is to provide a motor of the nature indicated which will be compact, and will employ a small volume of liquid such as oil, and be economical in operation.

Figure 1:
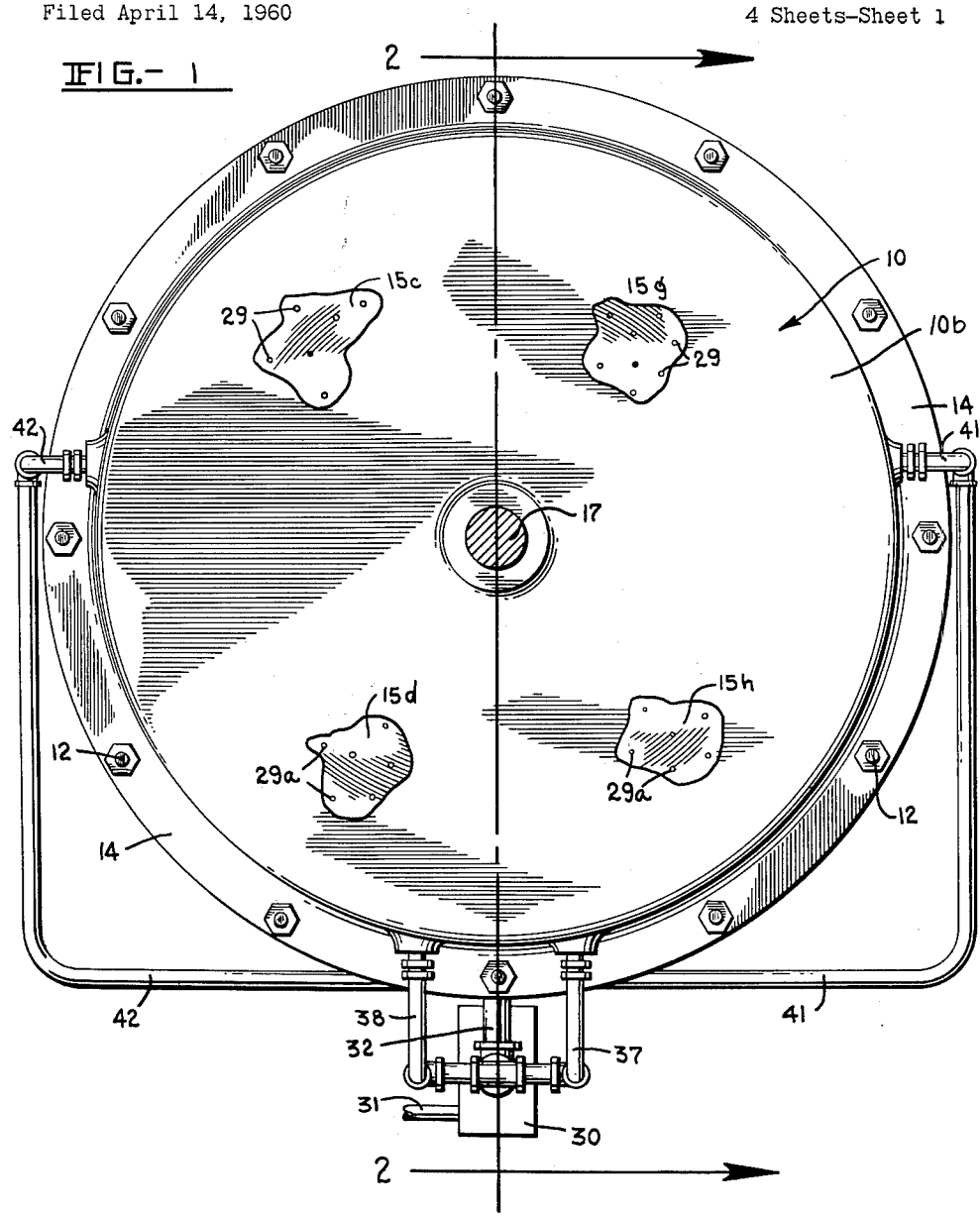
Figure 6:
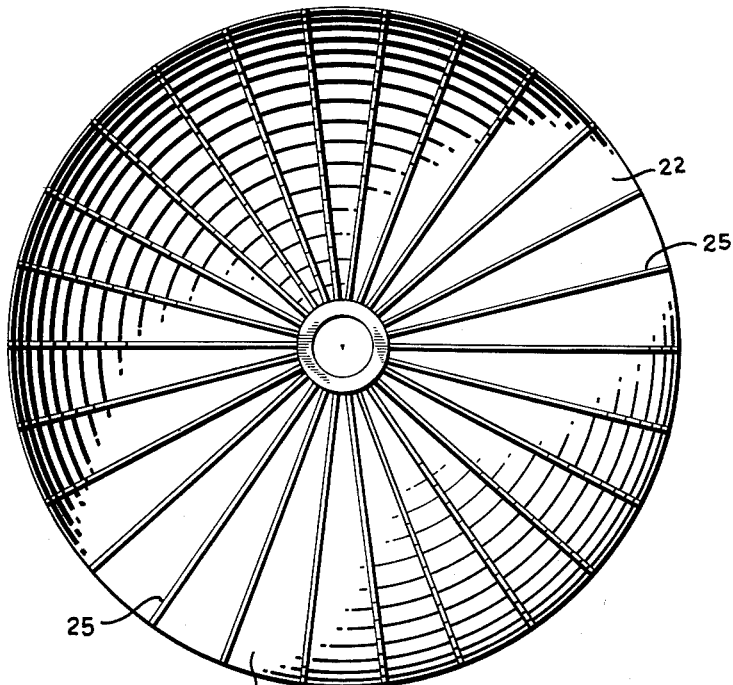
Figure 7:
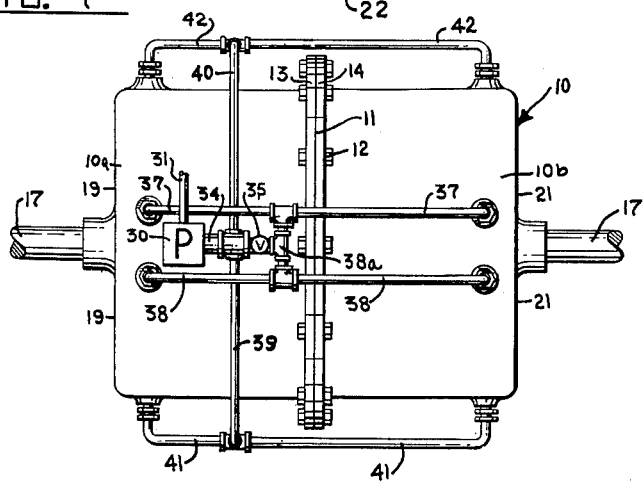

These and many other objects and advantages of the invention will become apparent to those versed in the art in the following description of one particular form of the invention as illustrated in the accompanying drawings, in which FIG. 1 is a view of side elevation and partial section;
FIG. 2 is a vertical section on the line 2—2 in FIG. 1;
FIG. 3 is a detail on an enlarged scale of nozzles incorporated in the stator wall;
FIG. 4 is a view in enlarged scale, in section of a reverse direction nozzle;
FIG. 5 is a vertical transverse section on the line 5—5 in FIG. 2;
FIG. 6 is a view in side elevation of the rotor; and
FIG. 7 is a bottom plan view.

There is a housing generally designated by the numeral 10 which is made in two parts 10a and 10b. In the form herein shown, these two housings 10a and 10b are symmetrical and meet on a central dividing plane 11 and are removably secured together by any suitable means such as by bolts 12 through flanges 13 and 14 surrounding the sections 10a and 10b.

The housing section 10a is provided with a convex wall 15 extending inwardly, and likewise the section 10b is provided with a similar convex wall 16. The two sections 10a and 10b are cylindrical, and the walls 15 and 16 terminate by their ends short of the outer cylindrical walls 10c and 10d respectively.

A drive shaft 17 is journaled in the two housing sections 10a and 10b, axially thereof. The shaft 17 extends through the convex walls 15 and 16 with clearances preferably therearound formed by a cylindrical wall 18 integrally uniting the convex wall 15 with the side wall 19 of the housing section 10a, and the integral cylindrical wall 20 uniting the convex wall 16 with the section 10b wall 21.

A rotor designated by the numeral 22 is fixed to the shaft 17. This rotor is provided with concave faces 23 on the one side and 24 on the other side so as to leave a uniform space between the faces 23 and 24 and the walls 15 and 16 respectively. Each of these faces 23 and 24 is provided with a plurality of vanes 25 radiating from the central portion of the rotor 22. These vanes 25 terminate by their ends at the outer ends of the faces 23 and 24. The periphery of the rotor 22 forms a cylindrical surface of a diameter less than that of the inside diameter of the housing so that there is a clearance space left entirely along the outer housing wall 10c and 10d and the rotor 22. The junctures of the convex walls 15 and 16 with the housing sides 19 and 21 are cylindrical portions of the same radius as that of the rotor 22 so that the clearance space 26 extends from wall 19 to wall 21 of the housing 10. That is, this space 26 constitutes an annular spacing entirely around the rotor 22 as well as around the end portions of the walls 15 and 16, and the vanes 25 terminate in this cylindrical formation.

Referring to FIG. 5, intercavities are formed by dividing the space between the walls 15 and the housing wall 19 into four compartments, 15a, 15b, 15e, and 15f, on one side of the housing. This is accomplished by providing a vertical wall 27 between the wall 15, the cylindrical wall 18, and the housing wall 19. The central vertical wall 27 is divided into the upper portion 27a and a lower portion 27b. The inner ends of which two wall portions are integrally united with the cylindrical wall 18. Then there is a horizontal wall 28 divided into the two lengths 28a to the left, FIG. 5, and 28b to the right, integrally joining the cylindrical wall 18, the convex wall 15, and the housing wall 19. Compartments 15b, 15d, 15f, and 15h are formed on the other side of the rotor between the walls 16 and 21.

The walls 15 and 16 are provided with tapered passageways, FIG. 3 generally designated by the numeral 29. Each of these passageways 29 constitutes a nozzle with the larger end opening into the various chambers in each instance, 15a, 15b, 15c, 15d, 15e, 15f, 15g, and 15h. These nozzles are directed to the clearance spaced on each side of the rotor 22 within which extend the vanes 25 from the rotor to a running clearance with the convex walls 15 and 16.

A fluid pump, pumping for example oil, designated by the numeral 30 and is driven by any suitable means, such as through a shaft 31. This pump 30 should be of a high pressure type. An intake pipe 32 leads from through the cylindrical housing wall at a low point, herein shown as leading from an opening 33 in the housing section wall 10a. This pipe 32 connects with the intake of the pump 30. The discharge of the pump 30 is into a pipe 34 which leads to two valves, a forward rotor direction control valve 35 and a reverse rotor direction control valve 36. From the valve 35, two pipes 37 and 38 lead from a cross connection 38a to discharge through passageways respectively into the four lower compartments 15b, 15d, 15f and 15h. From the valve 36, two pipe lines 41 and 42 lead from a cross connection 39, 40 into the four compartments 15a, 15c, 15e, 15g.

In operation, the pump 30 is operated to set up the pressurizing of the oil taken in from the annular cavity 26, from the bottom thereof. When the rotor 22 is standing still, oil with drain into that cavity by gravity. The pressurized oil is allowed to flow through the valve 35 which may be termed the forward direction valve, and this valve 35 when open will deliver oil through the pipes 37 and 38 simultaneously into the compartments 15b, 15d, 15f and 15h. These compartments will eventually be completely filled with oil under pressure, and from the filled lower compartments the oil will be forced through the jet nozzles 29a, FIG. 4, against the vanes 25 of the rotor 22, the nozzles 29a being angularly directed in directions toward the vanes so as to cause the rotor 22 to rotate. The upper four compartments will not be pressurized so that the drive of the rotor 22 in this forward direction will be from the impact of the oil coming through the nozzles 29a from the four lower compartments.

Exhaust of the oil will be along the vanes 25 in the curving directions to flow into the annular cavity 26. from one side of the rotor 22 does not come into conflict sides so as to direct this exhausting oil in opposite lateral directions at the periphery of the rotor. In this way, there is no building up of pressure immediately at the ends of the vanes in the cavity 26. That is, the exhaust from one side of the rotor 22 does not come into conflict directly with the exhaust from the other side of the rotor.

This oil will of course be flowing out from the vanes throughout three hundred and sixty five degrees, and will flow after leaving the vanes around the cavity 26 to collect at the lower sides thereof and be drawn through the pipe 32 into the pump 30.

To reverse the direction of turning of the rotor 22, the valve 35 will be closed and the valve 36 opened. This will cause pressurized oil to flow into the four upper cavities 15a, 15c, 15e, and 15g to fill those cavities or compartments and be forced through the upper sets of nozzles 29 against the vanes 25 on each side of the rotor 22. The nozzles 29 are directed in directions substantially opposite to the directions of the nozzles 29a. In this manner, the vanes 25 will be driven oppositely from the initial forward direction of drive.

It is to be understood, that the orifices of the nozzles 29 and 29a will be distributed over the areas of the compartments through the walls 15 and 16 circumferentially therearound as well as horizontally thereacross. The number of these nozzles in each instance will depend upon the power to be developed at the shaft 17, in turn depending upon the pressures employed at the pump 30.

While I have herein shown and described my invention in the one particular form, it is obvious that structural changes may be employed without departing from the spirit of the invention, such, for example, as in the construction of the nozzles, the vanes of the rotor, and other mechanical elements, all without departing from the spirit of the invention, and I therefore do not desire to be limited to that precise form beyond the limitations which may be imposed by the following claims.

I claim:

1. A fluid type rotary motor comprising a housing; a shaft; a rotor mounted on the shaft and having a concave face on one side thereof; a rotor housing about said rotor; a housing member having a convex surface directed toward said face extending into the space defined by said rotor face; and spaced therefrom; the centers of curvatures of said face and said surface being located on the axis of said shaft; a plurality of circumferentially spaced apart vanes fixed to and extending across said face from a zone around said shaft and terminating at the periphery of said rotor, the vanes extending across the space toward said convex surface with a running clearance therebetween; said housing having a compartment therewithin over which said surface extends; a plurality of nozzles extending from said compartment through said surface directed toward common sides of said vanes, said nozzles being located in spaced apart relation both radially and circumferentially of the shaft through that part of the convex surface over said compartment; a fluid inlet into said compartment; said housing having an annular chamber around the peripheral opening between said face and said surface receiving exhaust fluid from between outer vane ends; and said chamber having an exhaust discharge from its lowermost side.

2. The structure of claim 1 in which there is a second chamber within said housing and over which said convex surface extends; and a plurality of reversing nozzles extending from the second chamber through said surface both radially and circumferentially of said surface toward opposite sides of the vanes from which the first nozzles are directed; and a fluid inlet into said second chamber.

3. The structure of claim 1 in which there is a concave surface on the second side oppositely disposed in relation to the first side face; a second portion of said housing having a convex surfaced member extending into the concavity of the second side; circumferentially spaced apart vanes carried by said second side from near said shaft to the periphery of the rotor and extending toward said second member with a running clearance therebetween; said annular chamber extending across and around said rotor to receive exhaust fluid from between said second blades; said second housing member having a fluid receiving compartment; and a plurality of nozzles discharging from the second compartment through its convex surface directed toward said second set of vanes in common driving relation with the nozzles of the first compartment.

References Cited in the file of this patent

UNITED STATES PATENTS

| 137,171 | Bloch | Mar. 25, 1873 |
| 213,624 | Clime | Mar. 25, 1879 |
| 553,097 | Bookwalter | Jan. 14, 1896 |
| 624,348 | Lighthall | May 2, 1899 |
| 955,478 | Seelye | Apr. 19, 1910 |